United States Patent
Aoki et al.

(10) Patent No.: US 12,312,655 B2
(45) Date of Patent: May 27, 2025

(54) METHOD FOR PROCESSING ELECTRONIC AND ELECTRICAL DEVICE COMPONENT SCRAP

(71) Applicant: JX ADVANCED METALS CORPORATION, Tokyo (JP)

(72) Inventors: Katsushi Aoki, Hitachi (JP); Tsubasa Takeda, Hitachi (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 884 days.

(21) Appl. No.: 16/981,593

(22) PCT Filed: Mar. 18, 2019

(86) PCT No.: PCT/JP2019/011293
§ 371 (c)(1),
(2) Date: Sep. 16, 2020

(87) PCT Pub. No.: WO2019/177177
PCT Pub. Date: Sep. 19, 2019

(65) Prior Publication Data
US 2021/0017626 A1    Jan. 21, 2021

(30) Foreign Application Priority Data

Mar. 16, 2018    (JP) ................................. 2018-050078

(51) Int. Cl.
*B03C 1/02*    (2006.01)
*B09B 5/00*    (2006.01)
(Continued)

(52) U.S. Cl.
CPC ................ *C22B 7/005* (2013.01); *B03C 1/02* (2013.01); *B09B 5/00* (2013.01); *C22B 1/005* (2013.01);
(Continued)

(58) Field of Classification Search
CPC ...... C22B 7/005; C22B 1/005; C22B 15/0056; B03C 1/02; B03C 2201/20; B09B 5/00;
(Continued)

(56) References Cited

U.S. PATENT DOCUMENTS

| 3,905,556 A | 9/1975 | Drage |
| 2017/0259274 A1* | 9/2017 | Adams ................... B02C 23/10 |
| 2021/0039146 A1 | 2/2021 | Aoki et al. |

FOREIGN PATENT DOCUMENTS

| CN | 102962244 A | 3/2013 |
| CN | 111670259 A | 9/2020 |

(Continued)

OTHER PUBLICATIONS

Office Action issued in corresponding Korean Application No. 10-2020-7029455 on Feb. 10, 2022, with English translation.
(Continued)

*Primary Examiner* — Anthony M Liang
*Assistant Examiner* — Maxwell Xavier Duffy
(74) *Attorney, Agent, or Firm* — Birch, Stewart, Kolasch & Birch, LLP

(57) ABSTRACT

Provided is a method for processing electronic and electrical device component scrap, which can increase an amount of electronic and electrical device component scrap processed in a smelting step and efficiently recover valuable metals. The method for processing electronic and electrical device component scrap includes: a step 1 of removing powdery materials and film-shaped component scrap from the electronic and electrical device component scrap; a step 2 of concentrating synthetic resins and substrates from the electronic and electrical device component scrap from which the powdery materials and film-shaped component scrap have
(Continued)

been removed; and a step 3 of concentrating the substrates containing valuable metals from a concentrate obtained in the step 2.

8 Claims, 1 Drawing Sheet

(51) Int. Cl.
    *C22B 1/00*         (2006.01)
    *C22B 7/00*         (2006.01)
    *B07B 4/08*         (2006.01)
    *B07C 5/342*       (2006.01)
    *B07C 5/344*       (2006.01)
    *B07C 5/36*         (2006.01)

(52) U.S. Cl.
    CPC ............. *B03C 2201/20* (2013.01); *B07B 4/08* (2013.01); *B07C 5/3422* (2013.01); *B07C 5/344* (2013.01); *B07C 5/363* (2013.01)

(58) Field of Classification Search
    CPC ......... B07B 4/08; B07C 5/3422; B07C 5/344; B07C 5/363; Y02P 10/20
    See application file for complete search history.

(56) References Cited

FOREIGN PATENT DOCUMENTS

| DE | 10 2004 041 494 | A1 | | 3/2006 | |
|---|---|---|---|---|---|
| EP | 0 512 229 | A2 | | 11/1992 | |
| EP | 0 512 229 | A3 | | 6/1994 | |
| EP | 1786564 | B1 | * | 11/2010 | ........... B02C 17/007 |
| JP | H07-256231 | A | | 10/1995 | |
| JP | 9-78151 | A | | 3/1997 | |
| JP | 2001-58138 | A | | 3/2001 | |
| JP | 2001-96261 | A | | 4/2001 | |
| JP | 2002-59082 | A | | 2/2002 | |
| JP | 3275654 | B2 | * | 4/2002 | |
| JP | 2002-194448 | A | | 7/2002 | |
| JP | 2003112156 | A | * | 4/2003 | |
| JP | 2013-685 | A | | 1/2013 | |
| JP | 2013000685 | A | * | 1/2013 | |
| JP | 2015-123418 | A | | 7/2015 | |
| JP | 2016-84490 | A | | 5/2016 | |
| JP | 2017-170387 | A | | 9/2017 | |

OTHER PUBLICATIONS

Chinese Office Action and Search Report for corresponding Chinese Application No. 201980019391.2, dated Sep. 24, 2021, with an English translation.
Extended European Search Report for corresponding European Application No. 19767564.8, dated Jan. 10, 2022.
International Search Report for PCT/JP2019/011293 mailed on Jun. 18, 2019.
Written Opinion of the International Searching Authority for PCT/JP2019/011293 mailed on Jun. 18, 2019.
English translation of the International Preliminary Report on Patentability (Form PCT/IB/338) and Written Opinion of the International Searching Authority (Form PCT/ISA/237), dated Oct. 1, 2020, for International Application No. PCT/JP2019/011293.
Chinese Office Action and Search Report for corresponding Chinese Application No. 201980019391.2, dated May 7, 2022, with English translation.

* cited by examiner

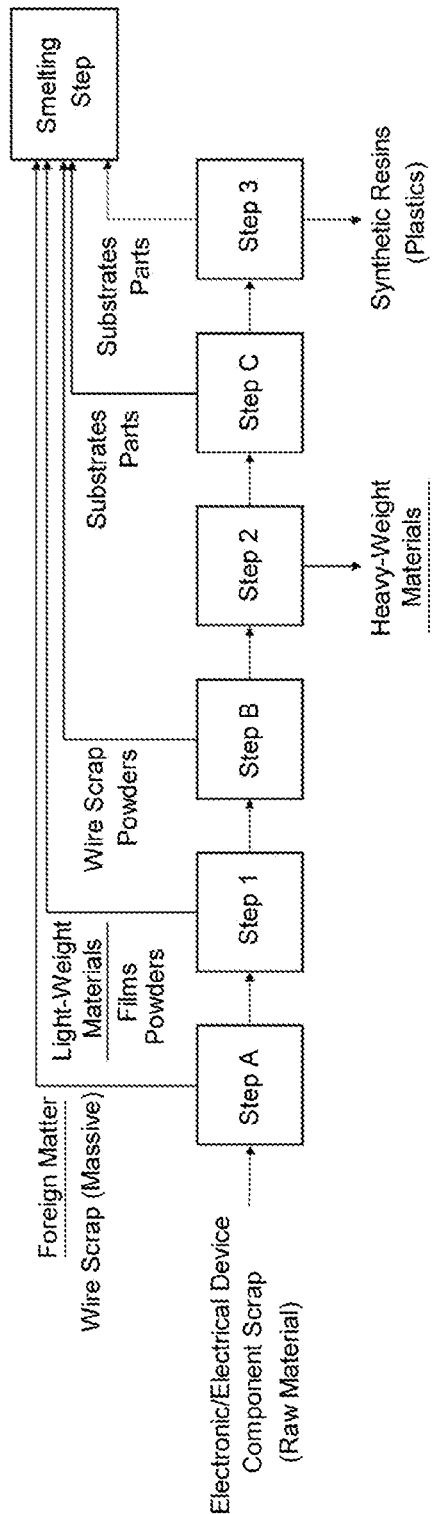

METHOD FOR PROCESSING ELECTRONIC AND ELECTRICAL DEVICE COMPONENT SCRAP

FIELD OF THE INVENTION

The present invention relates to a method for processing electronic and electrical device component scrap. More particularly, it relates to a method for processing electronic and electrical device component scrap, which is suitable for recycling of used electronic and electrical devices.

BACKGROUND OF THE INVENTION

From the viewpoint of recent resource conservation, recovery of variable metals from electronic and electrical device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with copper smelting in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device component scrap processed may lead to an increase in a carbon component contained in organic substances such as resins forming the electronic and electrical device component scrap, which may cause troubles due to over-reduction in the smelting furnace. On the other hand, since the amount of the electronic and electrical device component scrap processed tends to be increased in recent years, there is a need for efficient processing in the copper smelting flash furnace.

As one of methods for suppressing the generation of troubles due to over-reduction in the copper smelting flash furnace, it is proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

However, the increased amount of electronic and electrical device component scrap processed leads to introduction of a larger amount of unwanted substances (smelting inhibitors) for processing in the subsequent copper smelting step than that of the prior arts, depending on types of substances contained in the electronic and electrical device component scrap. An increased amount of such smelting inhibitors introduced into the copper smelting step arises a situation where an amount of the electronic and electrical device component scrap to be introduced has to be limited.

Conventionally, many efforts have been made for thermodynamic methods in a smelting step and purifying methods for electrolytic solutions in an electrolytic step of copper smelting, including the smelting inhibitors derived from natural ores. However, there are many problems in the method for processing the electronic and electrical device component scrap having very high contents of the smelting inhibitors than the natural ores.

CITATION LIST

Patent Literatures

[Patent Literature 1] Japanese Patent Application Publication No. H09-78151 A
[Patent Literature 2] Japanese Patent Application Publication No. 2015-123418 A

SUMMARY OF THE INVENTION

In view of the above problems, the present invention provides a method for processing electronic and electrical device component scrap, which can increase an amount of electronic and electrical device component scrap processed in a smelting step and efficiently recover valuable metals.

As a result of intensive studies to solve the above problems, the present inventors have found that it is effective to subject electronic and electrical device component scrap to sorting processes in certain order, as a processing method that can minimize smelting inhibitors contained in the electronic and electrical device component scrap, which would otherwise be carried into the smelting step.

In one aspect, the present invention completed on the basis of the above findings provide a method for processing electronic and electrical device component scrap, the method comprising: a step 1 of removing powdery materials and film-shaped component scrap from the electronic and electrical device component scrap; a step 2 of concentrating synthetic resins and substrates from the electronic and electrical device component scrap from which the powdery materials and film-shaped component scrap have been removed; and a step 3 of concentrating the substrates containing valuable metals from a concentrate obtained in the step 2.

In one embodiment, the method for processing electronic and electrical device component scrap according to the present invention further comprises, prior to the step 1, a pre-processing step A of removing wire scrap contained in the electronic and electrical device component scrap.

In another embodiment, the method for processing electronic and electrical device component scrap according to the present invention further comprises a step B of removing wire scrap contained in the electronic and electrical device component scrap between the steps 1 and 2.

In another embodiment, the method for processing electronic and electrical device component scrap according to the present invention further comprises, prior to the step 3, a step C for decreasing a metal content in the concentrate obtained in the step 2.

In still another embodiment of the method for processing electronic and electrical device component scrap according to the present invention, the step 1 is wind force sorting.

In still another embodiment of the method for processing electronic and electrical device component scrap according to the present invention, the step 2 is wind force sorting.

In still another embodiment of the method for processing electronic and electrical device component scrap according to the present invention, the step 3 comprises processing the substrates with a sorter, the sorter comprising: a metal sensor; a color camera; an air valve; and a conveyor.

In still another embodiment of the method for processing electronic and electrical device component scrap according to the present invention, the step B comprises removing the wire scrap using a sieving machine having a slit-shaped sieve.

In still another embodiment of the method for processing electronic and electrical device component scrap according to the present invention, the step C comprises at least one process selected from sorting with a color sorter, sorting with sieving, and sorting with magnetic sorting.

According to the present invention, it is possible to provide a method for processing electronic and electrical device component scrap, which can increase an amount of electronic and electrical device component scrap processed in a smelting step and efficiently recover valuable metals.

BRIEF DESCRIPTION OF THE DRAWINGS

FIG. 1 is a processing flow chart illustrating an example of a processing flow of electronic and electrical device component scrap according to an embodiment of the present invention.

DETAILED DESCRIPTION OF THE INVENTION

An embodiment of the present invention will be described below with reference to the processing flow chart of FIG. 1. The method for processing electronic and electrical device component scrap according to the embodiment of the present invention includes at least a step 1, a step 2, and a step 3. Further, steps A to C can be optionally combined before and after the steps 1 to 3 according to properties of the electronic and electrical device component scrap.

As used herein, the "electronic and electrical device component scrap" refers to scrap obtained by crushing electronic and electrical devices such as waste home electric appliances, PCs, and mobile phones, recovering them and then crushing them to have an appropriate size. In the present invention, the crushing for obtaining the electronic and electrical device component scrap may be performed by an operator. However, crushed objects may be purchased on the market.

The crushing method is carried out by any apparatus that is not limited to a specific apparatus, and may be carried out in sharing or shock manner. It is desirable to carry out crushing such that the shape of the component is maintained as much as possible. Therefore, the apparatus does not include one belonging to the category of a crusher for the purpose of fine crashing.

The electronic and electrical device component scrap according to the present embodiment can be classified into component scrap consisting of synthetic resins (plastics) used for substrates, parts such as ICs and connectors, and casings; wire scraps; metals; film-shaped component scrap; powders generated by crushing or pulverizing; and others, and they can be further classified into subclasses depending on purposes of the processing. In the present embodiment, the electronic and electrical device component scrap that has been crushed to have a particle diameter of 50 mm or less and has a percentage of individual components separated as component scrap of 70% or more may preferably be processed, although not limited thereto.

(1) Step 1

In the step 1, powdery materials and film-shaped component scrap (resins, aluminum foils, and the like) as materials that would be adversely affected on the subsequent sorting step are selectively removed from the raw material electronic and electrical device component scrap. This serves as pre-processing for the subsequent step and is categorized as coarse sorting.

As the step 1, wind force sorting is preferably used. For the purpose of the present invention, this wind force sorting is characterized by an ability to process a large number of materials. By the wind force sorting, the materials were divided into light-weight materials and heavy-weight materials. The powdery materials and film-shaped scrap (resins, aluminum foils, and the like) as the light-weight materials are sent to a copper smelting step via a pre-incineration processing step, and the heavy-weight materials are sent to the step 2.

A flow rate of air in the step 1 can be set to 5 to 20 m/s, and more preferably 5 to 12 m/s, and further preferably about 5 to 10 m/s, and even more preferably 6 to 8 m/s, although not limited to those conditions.

(2) Step 2

In step 2, synthetic resins, substrates and parts are concentrated from the electronic and electrical device component scrap from which the powdery materials and film-shaped component step has been removed.

As the step 2, wind force sorting is preferably used. In the step 2, massive metals or other individual components are separated as heavy-weight materials, and substrates, plastics and other synthetic resins are concentrated on the light-weight material side. The substrates and synthetic resins concentrated on the light-weight material side are sent to the step 3 that is the next step. Further, the heavy-weight materials are optionally subjected to a combination of magnetic force sorting, eddy current sorting, color sorter, manual sorting, robot sorting, and the like to recover metals such as Fe, Al and SUS which are present in the heavy-weight materials.

A flow rate of air in the step 2 can be set to 5 to 20 m/s, more preferably 10 to 18 m/s, further preferably 15 to 18 m/s, and even more preferably about 16 to 17 m/s, although not limited to those conditions.

(3) Step 3

In the step 3, substrates containing valuable metals such as copper, gold, and silver are concentrated from the light-weight materials containing the substrates, the synthetic resins, and the like obtained in the step 2. By concentrating the substrates containing the valuable metals and processing them in a copper smelting step as described later, a recovery efficiency of the valuable metals in the copper smelting step can be improved.

In the step 3, the processing is preferably carried out using a sorter including a metal sensor, a color camera, an air valve and a conveyor. In the step 3, first, the metal sensor detects the metals, the conveyer conveys and discharges the metals, and the subsequent color camera confirms positions of the substances. Then, based on information from the metal sensor and positional information from the color camera, it is preferable to carry out a process of selectively shooting down the components which are recognized as non-metal objects and are on a falling trajectory, by means of the air valve.

The substrates containing the valuable metals such as copper and precious metals are concentrated on the side of the sorted products that have not been shot down by the air valve. Therefore, those substrates can be used as processing objects to increase an efficiency of recovering valuable metals with a less amount of component scrap introduced.

On the other hand, the substrates and the synthetic resins that are substantially free of metal, shot down by the air valve, may contain Sb or one or more metals selected from the group consisting of Sb, Al, Fe and Ni, which will be smelting inhibitors in a smelting step as described later. By sending the component scrap containing such smelting inhibitors to the smelting step, it may be difficult to perform the smelting step stably, so that it may be difficult to recover the valuable metals with a high efficiency.

According to the processing method of the present embodiment, by the step 3, the substrate scrap and the like containing at least Sb or one or more metals selected from the group consisting of Sb, Al, Fe, and Ni which are the smelting inhibitors can be removed in advance, thereby preventing the smelting inhibitors contained in the electronic and electrical device component from being brought as much as possible.

In addition, when the powdery materials or the film-shaped component scrap are contaminated into the processing objects in the process of the step 3, the metal sorter results in deterioration of the field of view of the color camera by flowing up the powdery materials and the like during the sorting, so that it may be difficult to specify the removing objects using the color camera, or the color camera may erroneously detect the removing objects and the air valve may be erroneously operated to cause non-objects to be caught into the valve.

According to the method according to the embodiment of the present invention, the powdery materials, the film-shaped component scrap and the like contained in the electronic and electrical device component scrap, which causes a decrease in the sorting efficiency in the sorting step, have been previously removed in the step 1 and the step B, so that it is possible to suppress malfunction of the metal sorter and the decrease in the sorting efficiency due to flowing-up of the powdery materials during the processing.

In a general physical sorting method for concentrating metals, the metals are first recovered by magnetic force sorting or the like. However, the magnetic force sorter has a risk that the component scrap containing the valuable metals may be contaminated into the magnetic material to decrease an amount of the valuable metals recovered.

According to the processing method according to the embodiment of the present invention, the wind force sorting is carried out in two stages (the step 1 and the step 2) in the initial stage of physical sorting, so that a large amount of electronic and electrical device component scrap (raw materials) can be sorted at once while concentrating a larger amount of valuable metals than the case where the process of the magnetic force sorting is carried out. Then, after the two-stage wind power sorting, the sorting process (step 3) using the metal sorter, which requires a long processing time, can be combined, thereby removing the smelting inhibitors while increasing the amount of the electronic and electrical device component scrap to recover the valuable metals efficiently.

As shown in FIG. 1, it is more preferable to combine the steps A to C before and after the steps 1 to 3 in terms of an improved sorting efficiency. It is preferable that the step A is a pre-processing step of removing the wire scrap contained in the electronic and electrical device component scrap, prior to the step 1. For example, depending on the type of the electronic and electrical device component scrap, a large amount of scrap may be contained so that the scrap can be easily identified by visual inspection. Therefore, it is preferable to remove the wire scrap by manual sorting or mechanical sorting using a robot or the like, prior to the step 1.

It is preferable to have the step B of removing the wire scrap contained in the electronic and electrical device component scrap between the step 1 and the step 2. As the step B, the wire scrap is preferably removed using a sieving machine having a slit-shaped sieve. In the step B, the powdery materials can be removed in addition to the wire scrap by sieving. The sieved powdery materials and copper wire scrap can be sent to the smelting step via the pre-incineration processing step to recover the valuable metals in the component scrap more efficiently.

A step C may be carried out between the step 2 and the step 3. The step C includes at least one process of sorting with a color sorter, sorting with sieving, and sorting with magnetic sorting, and can be regarded as a pre-processing for the sorting process of the step 3. These sorting processes can be combined to decrease the metal content in the processing objects sent to the step 3.

A higher metal content in the processing objects means that there is a large amount of component scrap containing the metals. In the process using the metal sorter in the step 3, when there are non-metal objects such as synthetic resins between the component scraps detected as the metals, they may be erroneously detected as a single metal when a distance between the component scraps is within a detection range of the metal sensor, and the synthetic resins such as plastics, which are non-metal objects between the metal objects, may not repelled by the air valve and handled as metal-containing substrates. Therefore, before carrying out the separation using the metal sorter in the step 3, the step C including the sorting with the magnetic sorting, the sieving, the color sorter, and the like can be carried out to decrease the metal content in the processing objects sent to the step 3 to suppress the erroneous detection of the metal sorter.

A part of the substrate scrap to be processed in the copper smelting step may be contaminated into the heavy-weight materials obtained in the step 2. Therefore, the heavy-weight materials obtained in step 2 are further classified by a process such as magnetic force sorting, eddy current sorting, color sorter, manual sorting, and robot sorting, thereby separating the substrate scrap to be processed in the copper smelting process to send them to the smelting the step. Therefore, the recovery efficiency of the valuable metals can be improved.

In addition, the "removed" or "separated" as used herein includes not only an embodiment of removal or separation of 100%, but also an embodiment of removal of 30% or more, more preferably 50% by mass or more in the weight ratio in the objects.

—Smelting Step—

A method for processing electronic and electrical device component scrap according to an embodiment of the present invention includes a smelting step of processing electronic and electrical device component scrap containing valuable metals sorted in each of the steps 1 to 3 and the step A to C, in the smelting step.

When recovering copper as a valuable metal, the smelting step is carried out using a smelting furnace. The smelting step includes: a step of incinerating the electronic and electrical device component scrap; a step of crushing and sieving the incinerated scrap; and a step of subjecting the crushed and sieved scrap to copper smelting. The step of processing the electronic and electrical device component scrap is preferably carried out prior to the incinerating step.

As the smelting step according to the present embodiment, a copper smelting step using a flash furnace method can be preferably employed, although not limited thereto. In the copper smelting step using the flash furnace method, for example, copper concentrates, a solvent, and the electronic and electrical device component scrap are charged from a ceiling portion of a shaft of the flash furnace. The charged concentrates and the electronic and electrical device component scrap are melted in the shaft of the flash furnace to separate a mat containing, for example, from 50 to 68% of copper and slag floating above the mat in a settler of the flash furnace. Valuable metals such as copper, gold, and silver in the electronic and electrical device component scrap are absorbed into the mat that is retained in the flash furnace, so that the valuable metals can be recovered from the electronic and electrical device component scrap.

In copper smelting, it is important to introduce the electronic and electrical device component scrap having lager contents of valuable metals such as copper, gold and silver as the raw material to be processed, as much as possible, and carry out the processing, in order to produce copper and recover larger amounts of variable metals such as gold and silver. On the other hand, the electronic and electrical device component scrap contains substances that would affect the quality of products and byproducts in copper smelting and/or smelting inhibitors that would affect the copper smelting process. For example, the introduction of an increased amount of substances containing elements such as Sb and Ni as described above may lead to deterioration of the quality of electrolytic copper obtained by copper smelting.

Further, in a non-ferrous metal smelting step such as copper smelting, sulfuric acid is produced from sulfur dioxide generated by oxidation of concentrates. However, when hydrocarbon is mixed into sulfur dioxide, the produced sulfuric acid may be colored. Examples of sources of hydrocarbons include synthetic resins such as plastics, and a large amount of such synthetic resins may be contained depending on the composition of the electronic and electrical device component scrap carried into the copper smelting. The synthetic resins may also cause rapid combustion and smoke leakage in the smelting furnace, and even deterioration of equipment due to local heating.

Furthermore, for example, the presence of Al, Fe, or the like over a certain concentration in the smelting furnace may lead to a change of a slag composition in the process of copper smelting, which may affect the loss of valuable metals into the slag, so-called slag loss. Moreover, a large amount of halogen elements such as Cl, Br, and F contained in the electronic and electrical device component scrap to be introduced into the smelting furnace may cause corrosion of exhaust gas treatment equipment for copper smelting and deterioration of a sulfuric acid catalyst. Such a problem of contamination of the smelting inhibitors becomes apparent as an amount of the electronic and electrical device component scrap processed is increased, which cases a problem that the smelting step is burdened.

The method for processing the electronic and electrical device component scrap according to an embodiment of the present invention includes, prior to the smelting step, a physical sorting step of the electronic and electrical device component scrap, as shown in FIG. 1. This can allow a proportion of smelting inhibitors that are carried into the smelting step to be minimized, and allow an amount of the electronic and electrical device component scrap processed to be increased, and allow the proportion of the electronic and electrical device component scrap containing copper and valuable metals to be increased to recover copper and valuable metals efficiently.

It is more preferable that a larger amount of the smelting inhibitors contained in the electronic and electrical device component scrap is removed. However, there is component scrap having the smelting inhibitors and the valuable metals at the same time, depending on the type of the component scrap. By removing ½, more preferably ⅔ or more, in a weight ratio, of the smelting inhibitors in the entire electronic and electrical device component scrap raw material, the electronic and electrical device component scrap can be stably processed in the copper smelting step. Furthermore, assuming that a limit amount that can process the smelting inhibitors is the same as the present limit in the smelting process, the smelting inhibitors in the entire electronic and electrical device component scrap raw material are decreased, whereby a larger amount of electronic and electrical device component scrap containing a decreased amount of the smelting inhibitors can be processed in the smelting step.

According to the method for processing the electronic and electrical device component scrap according to the embodiment of the present invention, it is possible to provide a method for processing electronic and electrical device component scrap, which includes a physical sorting step of sorting and removing component scrap containing smelting inhibitors for each unit of components in the state of the component scrap before crushing the electronic and electrical device component scrap into powder in the smelting step, whereby a processing amount of the electronic and electrical device component scrap to be processed in the smelting process can be increased, and valuable metals can be efficiently recovered.

The invention claimed is:

1. A method for processing electronic and electrical device component scrap, the method comprising:
   a step 1 of removing powdery materials and film-shaped component scrap from the electronic and electrical device component scrap by wind force sorting;
   a step 2 of concentrating synthetic resins and substrates from the electronic and electrical device component scrap from which the powdery materials and film-shaped component scrap have been removed by wind force sorting which sorts the synthetic resins and the substrates as light-weight materials and the electronic and electrical device component scrap other than the synthetic resins and the substrates as heavy-weight materials; and
   a step 3 of concentrating the substrates containing copper, gold, or silver from a concentrate obtained in the step 2 by processing the light-weight materials with a sorter comprising a metal sensor, a color camera, an air valve, and a conveyor, wherein
   on the conveyor, the metal sensor detects metal objects among objects including non-metal objects and the color camera detects positions of the objects; and
   the air valve uses the detection result of the metal sensor to determine which objects should be shot by air among the objects detected by the color camera.

2. The method for processing electronic and electrical device component scrap according to claim 1, further comprising, prior to the step 1, a pre-processing step A of removing wire scrap contained in the electronic and electrical device component scrap.

3. The method for processing electronic and electrical device component scrap according to claim 1, further comprising a step B of removing wire scrap contained in the electronic and electrical device component scrap between the steps 1 and 2.

4. The method for processing electronic and electrical device component scrap according to claim 3, wherein the step B comprises removing the wire scrap using a sieving machine.

5. The method for processing electronic and electrical device component scrap according to claim 1, further comprising, prior to the step 3, a step C for decreasing a metal content in the concentrate obtained in the step 2.

6. The method for processing electronic and electrical device component scrap according to claim 5, wherein the step C comprises at least one process selected from sorting with a color sorter, sorting with sieving, and sorting with magnetic sorting.

7. The method for processing electronic and electrical device component scrap according to claim 1, wherein the metal sensor detects metal objects in the light-weight materials, and the air valve shoots non-metal objects in the light-weight materials obtained in the step 2.

8. The method for processing electronic and electrical device component scrap according to claim 1, wherein the metal sensor detects the substrates containing copper, gold, or silver and the air valve shoots down non-metal objects which are on a falling trajectory.

* * * * *